United States Patent [19]

Dominguez-Ahedo et al.

[11] 4,428,772

[45] Jan. 31, 1984

[54] METHOD FOR REDUCING METAL ORE

[75] Inventors: Carlos Dominguez-Ahedo, Garza Garcia; Hector Lopez-Ramos, Monterrey; Alejandro De-Gyves; Juan A. Villarreal-Treviño, both of San Nicolas de los Garza, all of Mexico

[73] Assignee: Hylsa, S.A., Monterrey, Mexico

[21] Appl. No.: 326,571

[22] Filed: Dec. 2, 1981

[51] Int. Cl.³ .............................................. C21B 13/02
[52] U.S. Cl. ............................................. 75/91; 75/35
[58] Field of Search ................................. 75/91, 35, 34

[56] References Cited

U.S. PATENT DOCUMENTS 3,905,806  9/1975  Cruse, Jr. et al. ...................... 75/35
4,040,816  8/1977  Altenhoner et al. .................... 75/35

Primary Examiner—M. J. Andrews
Attorney, Agent, or Firm—Curtis, Morris & Safford

[57] ABSTRACT

A method is disclosed for achieving improved reduction efficiency and economy in the reduction of particulate metal ores, e.g. iron ore, in a vertical shaft, moving bed reactor having a reduction zone in which a heated reducing gas is caused to flow through a portion of the ore bed to reduce the metal ore thereof to metal; e.g. sponge iron. The improved efficiency and economy is achieved through an integrated reduction system in which a conventional reformer is used without the need to upgrade the reformed gas prior to feeding it directly to the reduction reactor as a reducing gas.

12 Claims, 3 Drawing Figures

METHOD FOR REDUCING METAL ORE

This invention generally relates to the direct gaseous reduction of particulate ores to sponge metals in particulate form in a vertical shaft, moving bed reactor, and more specifically, to a method for improving the overall efficiency and economy of the reduction of the ore in such a reactor. By this invention a suitable hydrocarbon-containing gas and steam are reformed in a conventional-type reforming unit and fed directly to the reduction reactor as a reducing gas. In the following description the method is illustratively described as applied to the reduction of iron ore to sponge iron. However, as the description proceeds, it will be evident to those skilled in the art that the invention is equally applicable to the treatment of ores other than iron ore.

BACKGROUND OF THE INVENTION

In typical iron ore gaseous reduction systems incorporating a vertical shaft, moving bed reactor as exemplified in U.S. Pat. Nos. 3,765,872; 3,779,341 and 4,216,011, the iron ore is reduced by contacting it with a reducing gas having a relatively high reducing potential and a correspondingly low oxidant concentration. Such direct reduction systems utilize a vertical shaft, moving bed reactor having a reduction zone in the upper portion thereof and a cooling zone in the lower portion thereof. The iron ore is introduced through the top of the reactor and caused to flow downwardly through the reducing zone in which the ore is constructed with a heated reducing gas largely composed of carbon monoxide and hydrogen. The ore which has been reduced in the reducing zone flows into and downwardly through the cooling zone in which it is controllably cooled and carburized by a gaseous coolant prior to being discharged through the bottom of the reactor. The spent reducing gas leaving the reduction zone of the reactor is de-watered in a quench cooler and, if desired, is further upgraded by the removal of carbon dioxide. A major portion of this cooled, upgraded gas stream is then reheated and recycled to the reduction zone of the reactor to form a reducing gas loop. Similarly, a portion of the cooling gas is withdrawn from the cooling zone of the reactor, cooled and recycled to the cooling zone to form a cooling loop.

The reducing gas fed to the reduction zone of the reactor is typically generated in a conventional, catalytic reforming unit charged with steam and a suitable hydrocarbon-containing gas. In reduction systems utilizing a conventional reformer, before the reformed gas can be fed to the reactor as a reducing gas it must be de-watered to avoid the undesirable accumulation of excess oxidants (namely, carbon dioxide and water) in the reducing gas. The concentration of oxidants can be controlled by feeding the reformed gas to a quench cooler by which water is removed and then re-reheating the gas to the desired reduction temperature prior to being fed to the reactor.

In certain other known reduction systems such as those exemplified in U.S. Pat. Nos. 3,617,227; 3,748,120; 3,749,386; 3,764,123 and 3,905,806, the reducing gas generated in the reformer can be fed directly to the reduction reactor without removing water from the reformed gas before the gas is injected into the reactor. In order to prevent undesirable accumulation of oxidants in such processes it is essential to use a relatively expensive and more complicated reforming unit which must be especially designed and constructed to operate efficiently under relatively severe and narrow operating conditions. Such a reforming unit can best be described as a "stoichiometric reformer" in which the gas reformed therein has a low concentration of oxidants. In other words, the reformer outlet gas is suitable for direct use as a reducing gas without having to cool the gas to remove water prior to injection into the reactor. In order to prevent the accumulation of excess amounts of oxidants in the reformed gas and to avoid undesirable carbon deposition on the catalyst, the stoichiometric reformer must be operated at a relatively high temperature in the range of about 900° C., or higher, which operating temperature is substantially higher than that required for conventional or "non-stoichiometric" reforming units. The overall capital cost of a stoichiometric reforming unit is considerably higher than for a conventional reformer since the materials of construction must be extremely heat resistant. Additionally, when operating at such higher temperatures, special steps must be taken to insure that a high temperature resistant catalyst is used further complicating and increasing the overall cost of the reforming unit.

SUMMARY OF THE INVENTION

By the present invention an improved method for the gaseous reduction of iron ore is provided in which the overall efficiency and economy of the process are substantially increased. The method of this invention effectively combines the particular advantages of both types of processes described above, namely those processes using a non-stoichiometric reformer and a quench cooler as well as those processes using a stoichiometric reformer from which the reformed gas can be fed directly to the reactor.

It is accordingly an object of the present invention to provide an improved method for the reduction of iron ore to sponge iron exhibiting increased overall process efficiency, economy and flexibility of operation.

It is a further object of the invention to provide a reliable method for the reduction of metal ore by which a conventional, non-stoichiometric reformer can be used to generate fresh reducing gas while simultaneously eliminating the need to upgrade the reformed gas prior to its use as a reducing gas in the reactor.

Other objects, features and advantages of this invention will become more apparent to those skilled in the art from the description of the invention which follows.

GENERAL DESCRIPTION OF THE INVENTION

In the direct reduction of a metal ore in a moving bed reactor the combined concentration of oxidants (i.e. water and carbon dioxide) present in the reducing gas in large part determines the reducing efficiency of the reducing gas. Therefore, the most effective concentration of water which can be tolerated in the reducing gas fed to the reactor depends upon the amount of carbon dioxide present. It has been found that under normal operating conditions the maximum acceptable concentration of oxidants in the reducing gas fed to the reactor is in the range of 10–16% by volume. Furthermore, the water concentration should not exceed 6–12% by volume in order to insure that the most effective reducing potential for the reducing gas is achieved. If during steady state operation carbon dioxide is removed from the spent reducing gas being recycled to the reactor, the concentration of carbon dioxide in the reducing gas fed to the reactor can be controlled in the range of 3–4% by volume. The allowable water concentration can then be determined from the amount of total oxidants which can be tolerated in the reducing gas, i.e. 10–16% by volume, minus the amount of carbon dioxide present.

As described above, in the known iron ore reduction process exemplified by U.S. Pat. No. 3,765,872, the reformer effluent gas is de-watered in a quench cooler before being combined with the reducing gas recycle from the reactor which has also been de-watered and cooled. This combined stream is then heated to the desired reduction temperature in a suitable heating unit prior to injection into the reactor. In this process which uses a non-stoichiometric reformer, a sufficient quantity of water is removed from the reformer effluent gas stream in the quench cooler to lower the water concentration to acceptable levels of approximately 1–2% by volume. When using a stoichiometric reformer without a water removal step the reformed gas fed to the reactor will have a maximum water concentration of about 6% by volume. In a typical stoichiometric reformer the operating temperature must be about 935° C. with a steam to carbon molar ratio in the feed to the reformer of about 1.2 to insure a water concentration of 6%.

In the new novel method of the present invention, a conventional, non-stoichiometric reformer can be used without a water removal step by combining the reformer gas effluent with the spent reducing gas being recycled to the reactor after the recycle gas stream has been upgraded by the removal of carbon dioxide and water and heated in a suitable heating unit. The recycle or recirculation rate of the spent reducing gas is selected so that the maximum amount of oxidants in the combined reducing gas stream fed to the reactor does not exceed 16% by volume.

It will be appreciated by those skilled in the art that since reformers are typically designed to operate at a fixed temperature it is somewhat difficult to specify a precise range of effective operating temperatures. It has been found that in accordance with the present invention the non-stoichiometric reformer can be very successfully operated at a temperature in the range of 850° C. Furthermore, the most effective range of steam to carbon ratios in the feed to the reformer has been found to be 1.8 to 3.0. The most effective recirculation ratio, which is defined as the ratio of the amount of spent reducing gas recycle to the amount of freshly reformed gas from the non-stoichiometric reformer, has been found to be in the range of 1.5 to 3.0. It has been discovered that by carefully selecting and controlling the steam to carbon molar ratio of the reformer feed, the operating temperature of the reformer, the temperature of the spent reducing gas recycle and the recirculation ratio; the overall reduction efficiency and economy of the process is substantially increased.

SPECIFIC DESCRIPTION

Figure 1:
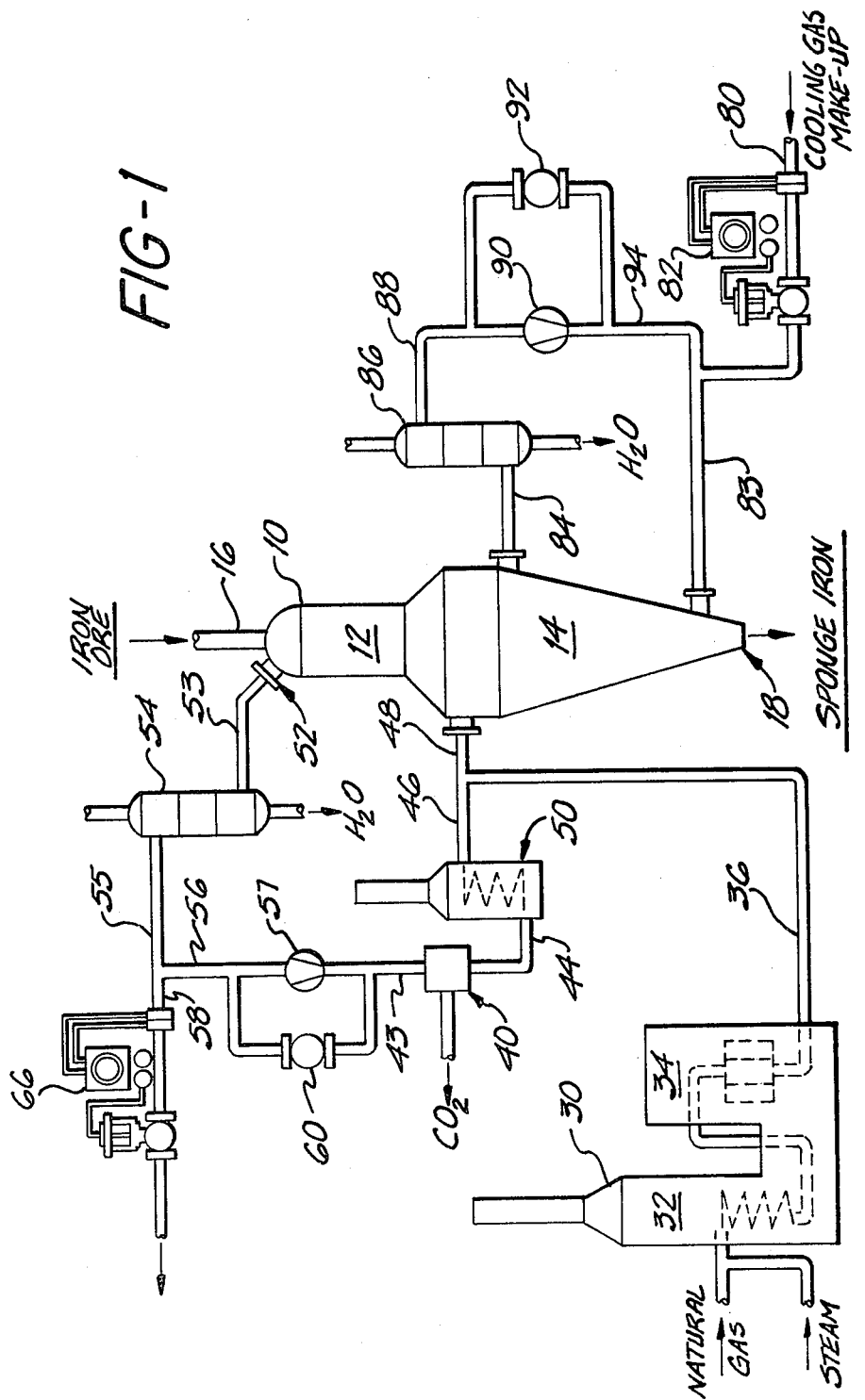
FIG. 1 is a diagrammatic illustration of a sponge iron production system wherein a conventional, non-stoichiometric reforming unit is used and the overall efficiency and economy of the process is maximized by combining the reformer gas effluent with the upgraded recycle gas and feeding the combined gas stream directly to the reactor as a reducing gas.
Figure 2:
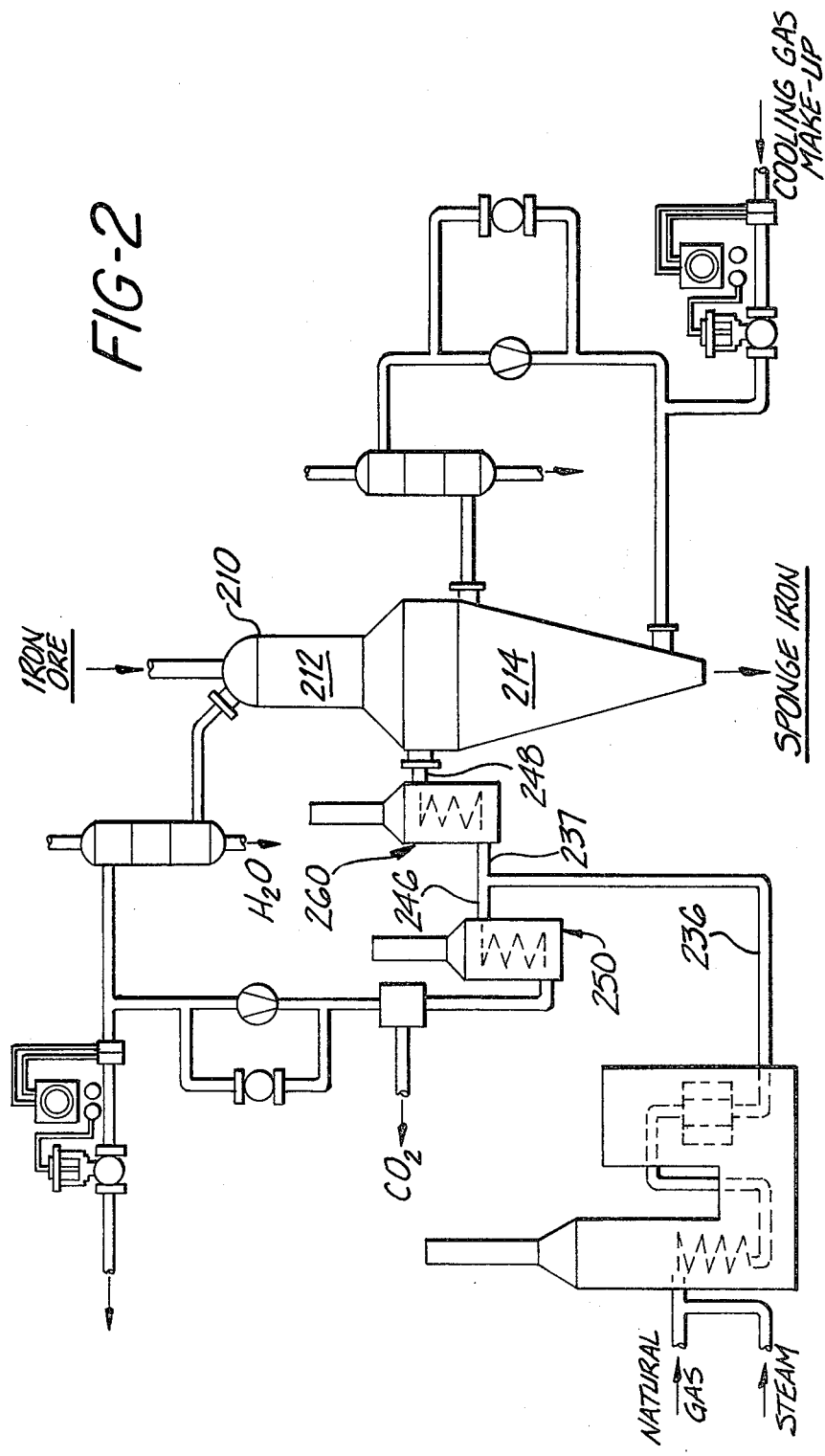
FIG. 2 is a diagrammatic illustration of a preferred embodiment of the invention wherein the combined gas stream is further heated in a supplemental heater prior to injection into the reactor as a reducing gas.
Figure 3:
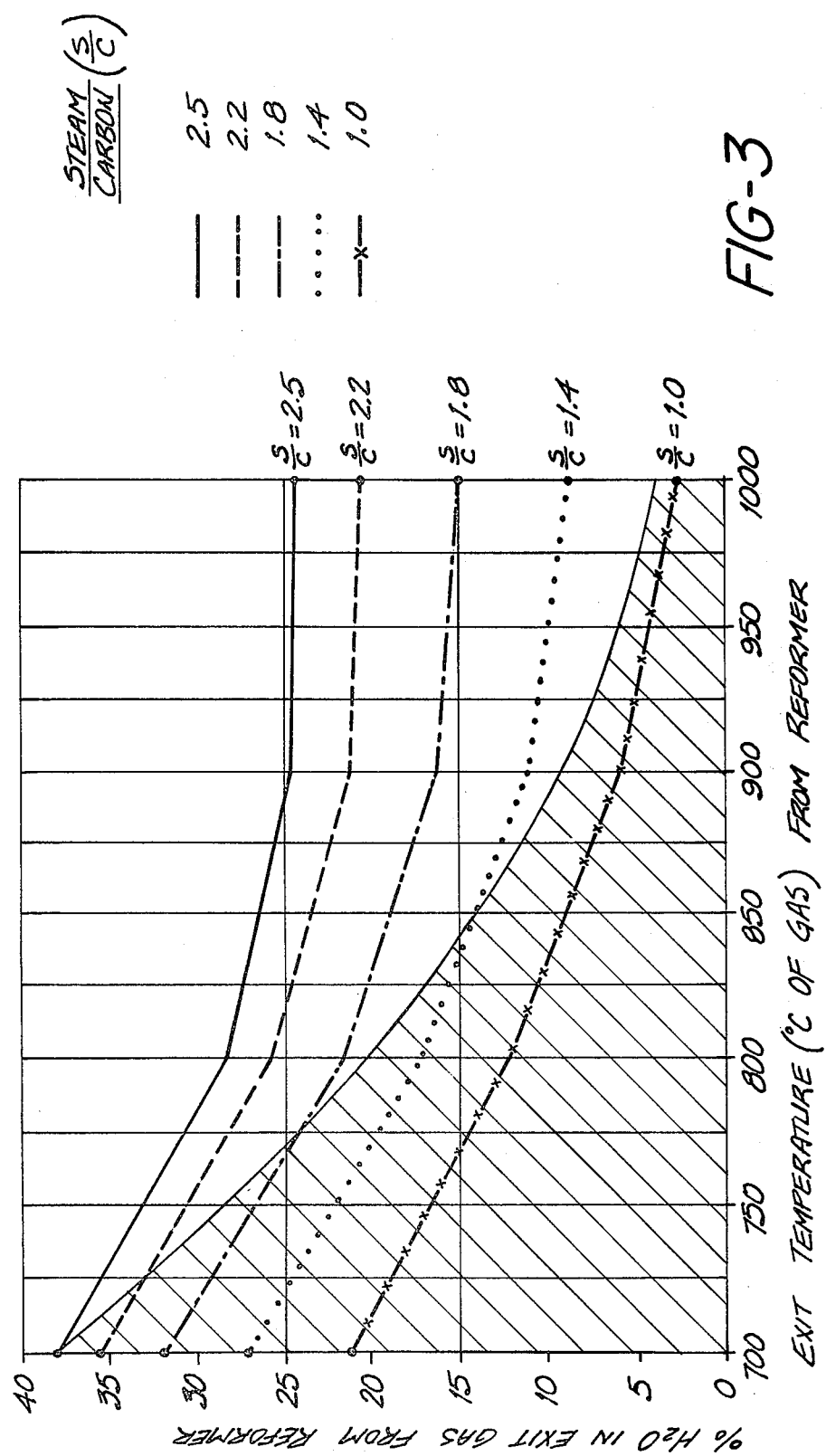
FIG. 3 is a graphical representation of the amount of water in the reformer gas effluent (%) as a function of the reformer gas effluent temperature (°C.) and the steam to carbon molar ratio in the reformer feed.

The objects and advantages of the present invention can best be understood and appreciated by reference to FIGS. 1 to 3. More particularly, FIG. 1 is a pictorial illustration of a direct reduction system adapted to be used in carrying out the method of the invention for the direct reduction of iron ore to sponge iron.

Referring to FIG. 1, the numeral 10 generally identifies a vertical shaft, moving bed reactor comprising a reduction zone 12 in the upper portion thereof and a cooling zone 14 in a lower portion thereof. Iron ore to be reduced is charged to the top of reactor 10 through reactor inlet 16 and sponge iron is removed at the bottom of reactor 10 through reactor outlet 18.

Referring to the left-hand portion of FIG. 1, fresh reducing gas is generated in reformer 30 which is a conventional, non-stoichiometric reformer as discussed above. In the embodiment illustrated in FIG. 1, natural gas and steam are preheated by being caused to flow through heating coils in the stack portion 32 of the reformer. The mixture of preheated natural gas and steam are then caused to flow through a heated catalyst bed in catalyst portion 34 of the reformer wherein the mixture is converted to a gas mixture largely comprising carbon monoxide, hydrogen and water vapor according to the following reactions:

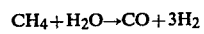

$CH_4 + H_2O \rightarrow CO + 3H_2$

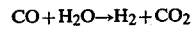

$CO + H_2O \rightarrow H_2 + CO_2$

The reformer gas outlet will also contain any un-reacted water.

The reformer operating characteristics are illustrated in FIG. 3 as being a function of the water concentration and temperature of the reformer gas effluent and the steam to carbon molar ratio of the gaseous feed to the reformer. The shaded portion in FIG. 3 represents the thermodynamic region in which the tendency for carbon deposition on the catalyst tubes of the reformer is unacceptably high resulting in corrosion of the tubes and catalyst poisoning of the reforming unit. It will be further understood by those skilled in the art that the catalyst tube wall temperature must exceed the reformed gas temperature by approximately 100° C. to insure that an effective rate of heat transfer to the gas is achieved. In the embodiment illustrated in FIG. 1 the reformer effluent gas temperature is 850° C. necessitating materials of construction of at least 950° C. When higher operating temperatures are required in the reformer as in the case of a stoichiometric reformer, the alloys used for the catalyst tube walls as well as the catalyst itself must be of an even higher grade to withstand temperatures at least as high as 1050° C.

Upon leaving reformer 30 the reformed gas flows through pipe 36 to a point of mixing with an upgraded reducing gas recycle stream. In the system shown in FIG. 1, the reducing gas flowing through reduction zone 12 of the reactor effectuates the reduction of the ore therein and the spent reducing gas exits from the reactor through discharge connection 52 and flows through pipe 53 into a water-cooled quench cooler 54.

After water is removed from the gas stream in quench cooler 54, the de-watered gas stream exits through pipe 55. The recycle gas flows through pipe 56 into compressor 57 controlled by regulating valve 60. The compressed recycle gas then flows through pipe 43 and is injected into carbon dioxide removal unit 40 wherein the recycle gas is upgraded by the absorption of carbon dioxide. The upgraded recycle gas exits from carbon dioxide removal unit 40 through pipe 44 and enters heater 50 wherein it is heated to a temperature in the range of 700° C. to 1100° C. depending upon the desired temperature of the reducing gas fed to the reactor. A portion of the gas recycle stream may be caused to flow from pipe 55 to pipe 58 containing flow control valve 66 to a suitable point of use.

The heated recycle gas leaving heater 50 flows through pipe 46 and combines with the freshly reformed reducing gas flowing through pipe 36. The combined gas stream flows through pipe 48 and is injected into the reactor at a temperature in the range of 700° C. to 1000° C. to form a reducing gas recycle loop.

The reduced ore flowing downwardly through reactor 10 is cooled by a suitable cooling gas in cooling zone 14 of the reactor. With specific reference to the lower right-hand portion of FIG. 1, cooling gas make-up enters the system through pipe 80 provided with an automatic flow controller 82. A wide variety of cooling gases may be used the selection of which depends upon the amount of carburization and cooling desired.

The cooling gas flowing through pipe 80 is injected into cooling zone 14 of the reactor from pipe 83 and is caused to flow upwardly through the cooling zone to cool and carburize the reduced ore therein. The cooling gas exits from the reactor through pipe 84 and flows into quench cooler 86. The cooled gas exits quench cooler 86 and flows through pipe 88 to compressor 90 controlled by regulating valve 92. The compressed cooling gas then flows through pipe 94 and combines with fresh cooling gas from pipe 80 and the combined stream is recycled to cooling zone 14 of the reactor to form a cooling gas loop.

Turning now to the embodiment shown in FIG. 2, the system there shown is largely the same as that shown in FIG. 1 and therefore only the differences between the systems of FIG. 1 and FIG. 2 will be described. In the reduction system of FIG. 1 the preferred reformer outlet gas temperature is 850° C. To achieve the desired reduction potential of the reducing gas fed to the reduction zone of the reactor the temperature of the reducing gas should be in the range of 700° C. to 1000° C., preferably 830° C. to 950° C. In those situations in which it is desired to operate at reducing gas temperatures in excess of 950° C. heater 50 will be required to heat the recycle gas stream to a temperature considerably higher than 950° C. to insure that the reducing gas fed to the reactor formed by combining the recycle gas stream and the freshly reformed gas will have the desired inlet temperature. Since process gas heaters which are required to operate at temperatures in excess of 1000° C. are considerably more expensive than conventional heaters operating at a temperature of about 950° C., it is advantageous to use a supplemental heater to supply the additional heat required to heat the already heated recycle gas stream and the freshly reformed gas stream to temperatures in excess of 950° C. before they are fed to the reactor. A further advantage in having a supplemental heater resides in the added process flexibility provided in situations where the operation of the primary heater or reformer may have to be modified to compensate for any process perturbations.

Referring to FIG. 2, the reactor 210 comprises a reduction zone 212 and cooling zone 214 similar to zones 12 and 14 of FIG. 1. The reducing gas flowing through reduction zone 212 exits the reactor and is recycled through a quench cooler, carbon dioxide removal unit and compressor similar to those described for FIG. 1. The recycle gas which has been upgraded is injected into a first heater 250 which can heat the recycle gas streams to a temperature as high as about 950° C. The heated recycle gas stream exits heater 250 and flows through pipe 246 to combine with freshly reformed gas flowing through pipe 236. The combined gas stream flows through pipe 237 and into a second or supplemental heating unit 260. Depending upon the temperature of the recycle gas stream and reformed gas stream as well as the recirculation ratio, the combined gas stream is heated to the desired reducing gas temperature which may be as high as 1000° C. The heated reducing gas exits heater 260 through pipe 248 and is then fed to the reactor.

The terms and expressions which have been employed are used as terms of description and not of limitation, and there is no intention in the use of such terms and expressions to exclude any equivalents of the features shown and described or portions thereof, it being recognized that various modifications are possible within the scope of the invention. For example, the natural gas feed to the reforming unit illustrated in FIG. 1 could be replaced by any suitable carbon-containing gas. Similarly, a suitable piping arrangement could be provided to by-pass or alternately feed the supplemental heating unit shown in the embodiment of FIG. 2.

We claim:

1. A method for reducing particulate metal ore to sponge metal in a vertical shaft, moving bed reactor having a reduction zone in which a hot reducing gas largely composed of carbon monoxide and hydrogen is caused to flow through a portion of said bed to reduce the metal ore thereof to sponge metal, which comprises:

feeding a first steam of reducing gas to the reduction zone of the reactor, said reducing gas having a temperature in the range of 700° to 1000° C. and a maximum combined water and carbon dioxide content of 16% by volume;

removing at least a portion of said first stream from the reactor as a second gas stream;

removing water and carbon dioxide from said second gas stream to form a third gas stream;

feeding said third gas stream to a heater unit;

heating said third gas stream to a temperature in the range of 700° to 1100° C.;

reforming a stream of hydrocarbon-containing gas and water in a reforming unit to form a make-up reducing gas wherein the stream fed to the reforming unit has a water to carbon molar ratio of at least 1.8;

combining said heated third gas stream with the make-up reducing gas at a flow ratio of 1.5:1 to 3.0:1 to form a fourth gas stream; and recycling said fourth gas stream to the reactor as said first stream.

2. The method of claim 1 wherein the maximum temperature of the make-up reducing gas is 850° C.

3. The method of claim 1 wherein the water content of said first stream of reducing gas is in the range of 6%–12% by volume.

4. The method of claim 1 wherein the third gas stream is heated to a temperature in the range of 830° C.–910° C.

5. The method of claim 1 wherein the hydrocarbon containing gas and water stream fed to the reforming unit has a water to carbon ratio in the range of 1.8 to 3.0.

6. The method of claim 1 wherein the hydrocarbon containing gas is natural gas.

7. A method for reducing particulate metal ore to sponge metal in a vertical shaft, moving bed reactor having a reduction zone in which a hot reducing gas largely composed of carbon monoxide and hydrogen is caused to flow through a portion of said bed to reduce the metal ore thereof to sponge metal, which comprises:
   feeding a first stream of reducing gas to the reduction zone of the reactor, said reducing gas having a temperature in the range of 700° to 1000° C. and a maximum combined water and carbon dioxide content of 16% by volume;
   removing at least a portion of said first stream from the reactor as a second gas stream;
   removing water and carbon dioxide from said second gas stream to form a third gas stream;
   feeding said third gas stream to a heater unit;
   heating said third gas stream to a temperature in the range of 700° to 950° C.;
   reforming a stream of hydrocarbon-containing gas and water in a reforming unit to form a make-up reducing gas wherein the stream fed to the reforming unit has a water to carbon molar ratio of at least 1.8;
   combining said heated third gas stream with the make-up reducing gas at a flow ratio of 1.5:1 to 3.0:1 to form a fourth gas stream;
   heating said fourth gas stream to a temperature in the range of 700° C. to 1000° C.; and
   recycling said heated fourth gas stream to the reactor as said first stream.

8. The method of claim 7 wherein the maximum temperature of said make-up reducing gas is 850° C.

9. The method of claim 7 wherein the water content of said first stream of reducing gas is in the range of 6%–12% by volume.

10. The method of claim 7 wherein the third gas stream is heated to a temperature in the range of 830° C.–910° C. and the fourth gas stream is heated to a temperature in the range of 830° C. to 1000° C.

11. The method of claim 7 wherein the hydrocarbon containing gas and water stream fed to the reforming unit has a water to carbon ratio in the range of 1.8 to 3.0.

12. The method of claim 7 wherein the hydrocarbon containing gas is natural gas.

* * * * *